US007862734B2

(12) United States Patent
McAvoy et al.

(10) Patent No.: US 7,862,734 B2
(45) Date of Patent: Jan. 4, 2011

(54) METHOD OF FABRICATING NOZZLE ASSEMBLY HAVING MOVING ROOF STRUCTURE AND SEALING BRIDGE

(75) Inventors: Gregory John McAvoy, Balmain (AU); Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 171 days.

(21) Appl. No.: 12/323,473

(22) Filed: Nov. 26, 2008

(65) Prior Publication Data

US 2010/0128082 A1 May 27, 2010

(51) Int. Cl.
*G01D 15/00* (2006.01)
*G11B 5/127* (2006.01)

(52) U.S. Cl. ........................... 216/27; 438/21; 29/890.1

(58) Field of Classification Search .................. 216/27; 29/890.1; 438/21; 347/29, 47
See application file for complete search history.

(56) References Cited

U.S. PATENT DOCUMENTS

| | | | | |
|---|---|---|---|---|
| 6,180,427 | B1 * | 1/2001 | Silverbrook | 438/21 |
| 6,682,874 | B2 * | 1/2004 | Ramaswami et al. | 430/320 |
| 6,767,474 | B2 * | 7/2004 | Trueba et al. | 216/27 |
| 6,994,422 | B2 * | 2/2006 | Park et al. | 347/47 |
| 7,007,859 | B2 | 3/2006 | Silverbrook | |
| 7,303,930 | B2 * | 12/2007 | Silverbrook | 438/21 |
| 2006/0092226 | A1 | 5/2006 | Silverbrook | |
| 2008/0225083 | A1 | 9/2008 | McAvoy et al. | |

FOREIGN PATENT DOCUMENTS

| | | | |
|---|---|---|---|
| EP | 0882593 | A1 | 12/1998 |

* cited by examiner

*Primary Examiner*—Roberts Culbert

(57) ABSTRACT

A method of fabricating an inkjet nozzle assembly having a seal member bridging between a moving portion and a stationary portion. The method includes the steps of: (a) providing a partially-fabricated printhead comprising a nozzle chamber sealed with a roof, (b) etching a via through the roof to define the moving portion on a first side of the via and the stationary portion on a second side of the via; (c) plugging the via with a plug of sacrificial material; (d) depositing a layer of flexible material over the plug; and (e) removing the plug to provide the inkjet nozzle assembly. The resultant seal member is comprised of the flexible material.

19 Claims, 13 Drawing Sheets

METHOD OF FABRICATING NOZZLE ASSEMBLY HAVING MOVING ROOF STRUCTURE AND SEALING BRIDGE

FIELD OF THE INVENTION

The present invention relates to the field of printers and particularly inkjet printheads. It has been developed primarily to improve print quality and reliability in high resolution printheads.

CO-PENDING APPLICATIONS

The following applications have been filed by the Applicant simultaneously with the present application:

CPH015US CPH016US

The disclosures of these co-pending applications are incorporated herein by reference. The above applications have been identified by their filing docket number, which will be substituted with the corresponding application number, once assigned.

CROSS REFERENCES TO RELATED APPLICATIONS

Various methods, systems and apparatus relating to the present invention are disclosed in the following US patents/patent applications filed by the applicant or assignee of the present invention:

| | | | | | | |
|---|---|---|---|---|---|---|
| 7,344,226 | 7,328,976 | 11/685,084 | 11/685,086 | 11/685,090 | 11/740,925 | 11/763,444 |
| 11/763,443 | 11,946,840 | 11,961,712 | 12/017,771 | 7,367,648 | 7,370,936 | 7,401,886 |
| 11/246,708 | 7,401,887 | 7,384,119 | 7,401,888 | 7,387,358 | 7,413,281 | 11/482,958 |
| 11/482,955 | 11/482,962 | 11/482,963 | 11/482,956 | 11/482,954 | 11/482,974 | 11/482,957 |
| 11/482,987 | 11/482,959 | 11/482,960 | 11/482,961 | 11/482,964 | 11/482,965 | 11/482,976 |
| 11/482,973 | 11/495,815 | 11/495,816 | 11/495,817 | 60,992,635 | 60,992,637 | 60,992,641 |
| 12,050,078 | 12,050,066 | 12,138,376 | 12,138,373 | 12,142,774 | 12,140,192 | 12,140,264 |
| 12,140,270 | 11/607,976 | 11/607,975 | 11/607,999 | 11/607,980 | 11/607,979 | 11/607,978 |
| 11/735,961 | 11/685,074 | 11/696,126 | 11/696,144 | 7,384,131 | 11/763,446 | 6,665,094 |
| 7,416,280 | 7,175,774 | 7,404,625 | 7,350,903 | 11/293,832 | 12,142,779 | 11/124,158 |
| 6,238,115 | 6,390,605 | 6,322,195 | 6,612,110 | 6,480,089 | 6,460,778 | 6,305,788 |
| 6,426,014 | 6,364,453 | 6,457,795 | 6,315,399 | 6,755,509 | 11/763,440 | 11/763,442 |
| 12,114,826 | 12,114,827 | 12,239,814 | 12,239,815 | 12,239,816 | 11/246,687 | 7,156,508 |
| 7,303,930 | 7,246,886 | 7,128,400 | 7,108,355 | 6,987,573 | 10/727,181 | 6,795,215 |
| 7,407,247 | 7,374,266 | 6,924,907 | 11/544,764 | 11/293,804 | 11/293,794 | 11/293,828 |
| 11/872,714 | 10/760,254 | 7,261,400 | 11/583,874 | 11/782,590 | 11/014,764 | 11/014,769 |
| 11/293,820 | 11/688,863 | 12,014,767 | 12,014,768 | 12,014,769 | 12,014,770 | 12,014,771 |
| 12,014,772 | 11/482,982 | 11/482,983 | 11/482,984 | 11/495,818 | 11/495,819 | 12,062,514 |
| 12,192,116 | 7,306,320 | 10/760,180 | 6,364,451 | 7,093,494 | 6,454,482 | 7,377,635 |

BACKGROUND OF THE INVENTION

Many different types of printing have been invented, a large number of which are presently in use. The known forms of print have a variety of methods for marking the print media with a relevant marking media. Commonly used forms of printing include offset printing, laser printing and copying devices, dot matrix type impact printers, thermal paper printers, film recorders, thermal wax printers, dye sublimation printers and ink jet printers both of the drop on demand and continuous flow type. Each type of printer has its own advantages and problems when considering cost, speed, quality, reliability, simplicity of construction and operation etc.

In recent years, the field of ink jet printing, wherein each individual pixel of ink is derived from one or more ink nozzles has become increasingly popular primarily due to its inexpensive and versatile nature.

Many different techniques on ink jet printing have been invented. For a survey of the field, reference is made to an article by J Moore, "Non-Impact Printing: Introduction and Historical Perspective", Output Hard Copy Devices, Editors R Dubeck and S Sherr, pages 207-220 (1988).

Ink Jet printers themselves come in many different types. The utilization of a continuous stream of ink in ink jet printing appears to date back to at least 1929 wherein U.S. Pat. No. 1,941,001 by Hansell discloses a simple form of continuous stream electro-static inkjet printing.

U.S. Pat. No. 3,596,275 by Sweet also discloses a process of a continuous inkjet printing including the step wherein the ink jet stream is modulated by a high frequency electro-static field so as to cause drop separation. This technique is still utilized by several manufacturers including Elmjet and Scitex (see also U.S. Pat. No. 3,373,437 by Sweet et al)

Piezoelectric ink jet printers are also one form of commonly utilized ink jet printing device. Piezoelectric systems are disclosed by Kyser et. al. in U.S. Pat. No. 3,946,398 (1970) which utilizes a diaphragm mode of operation, by Zolten in U.S. Pat. No. 3,683,212 (1970) which discloses a squeeze mode of operation of a piezoelectric crystal, Stemme in U.S. Pat. No. 3,747,120 (1972) discloses a bend mode of piezoelectric operation, Howkins in U.S. Pat. No. 4,459,601 discloses a piezoelectric push mode actuation of the inkjet stream and Fischbeck in U.S. Pat. No. 4,584,590 which discloses a shear mode type of piezoelectric transducer element.

Recently, thermal ink jet printing has become an extremely popular form of ink jet printing. The ink jet printing techniques include those disclosed by Endo et al in GB 2,007,162 (1979) and Vaught et al in U.S. Pat. No. 4,490,728. Both the aforementioned references disclosed ink jet printing techniques that rely upon the activation of an electrothermal actuator which results in the creation of a bubble in a constricted space, such as a nozzle, which thereby causes the ejection of ink from an aperture connected to the confined space onto a relevant print media. Printing devices utilizing the electro-thermal actuator are manufactured by manufacturers such as Canon and Hewlett Packard.

As can be seen from the foregoing, many different types of printing technologies are available. Ideally, a printing technology should have a number of desirable attributes. These include inexpensive construction and operation, high speed operation, safe and continuous long term operation etc. Each technology may have its own advantages and disadvantages in the areas of cost, speed, quality, reliability, power usage, simplicity of construction operation, durability and consumables.

The present Applicant has described a plethora of inkjet printheads, which are constructed utilizing micro-electromechanical systems (MEMS) techniques. As described in the Applicant's earlier U.S. application Ser. Nos. 11/685,084; 11/763,443; and 11/763,440, the contents of which are incorporated herein by reference, a MEMS inkjet printhead may comprise a nozzle plate having moving portions. Each moving portion typically has a nozzle opening defined therein so that actuation of the moving portion results in ejection of ink from the printhead.

An advantage of this type of printhead is that the energy required to eject a droplet of ink is small compared with, for example, traditional thermal bubble-forming printheads. The Applicant has previously described how specific actuator designs and complementary actuation methods provide highly efficient drop ejection from such printheads (see, for example, U.S. application Ser. Nos. 11/607,976 and 12/239,814, the contents of which are herein incorporated by reference).

However, a problem with 'moving nozzle' printheads is that they require a good fluidic seal between the moving portion and the stationary portion of the printhead. Ink should only be ejected through the nozzle opening and should not leak out of seals. If the distance between the moving portion and the stationary portion is small, then surface tension may retain ink inside nozzle chambers. However, the use of ink surface tension as a fluidic seal is problematic and usually cannot provide a reliable seal, especially if the ink inside nozzle chambers experiences pressure surges.

In the Applicant's earlier application Ser. Nos. 11/685,084; 11/763,443; and 11/763,440, there was described a method of fabricating a mechanical seal for moving portions of a nozzle plate. Typically, a flexible layer of polydimethylsiloxane (PDMS) is coated over the nozzle plate, which acts as a sealing membrane between the moving portions and the stationary part of the printhead. Moreover, the layer of PDMS provides a hydrophobic ink ejection surface, which is also highly desirable in terms of printhead fluidics and, ultimately, print quality.

It would be desirable to provide improved mechanical seals for inkjet printheads having moving nozzles. It would be particularly desirable to provide efficacious mechanical seals, which have minimal impact on the overall efficiency of the printhead.

SUMMARY OF THE INVENTION

In a first aspect the present invention provides a nozzle assembly for an inkjet printhead, said nozzle assembly comprising:

- a nozzle chamber comprising a roof having a nozzle opening defined therein, said roof comprising a moving portion moveable relative to a stationary portion, such that movement of said moving portion relative to said stationary portion causes ejection of ink through the nozzle opening;
- an actuator for moving said moving portion relative to said stationary portion; and
- a seal member configured as a bridge spanning between said moving portion and said stationary portion.

Optionally, said seal member is comprised of a polymeric material.

Optionally, said polymeric material is comprised of polydimethylsiloxane (PDMS).

Optionally, said seal member is absent from a space between said moving portion and said stationary portion.

Optionally, said seal member has a non-planar profile configured for facilitating movement of said moving portion.

Optionally, said seal member comprises at least one ridge and/or at least one furrow in profile.

Optionally, said seal member comprises a crown portion, said crown portion standing proud of a first end of said seal member connected to said moving portion and a second end of said seal member connected to said stationary portion.

Optionally, said seal member is corrugated.

Optionally, said nozzle opening is defined in said moving portion.

Optionally, said nozzle opening is defined in said stationary portion.

Optionally, said actuator is a thermal bend actuator comprising:

- a first active element for connection to drive circuitry; and
- a second passive element mechanically cooperating with the first element, such that when a current is passed through the first element, the first element expands relative to the second element, resulting in bending of the actuator.

Optionally, said first and second elements are cantilever beams.

Optionally, said thermal bend actuator defines at least part of the moving portion of said roof.

Optionally, the polymeric material is coated on a substantial part of said roof, such that an ink ejection face of said printhead is hydrophobic.

Optionally, each roof forms at least part of a nozzle plate of the printhead, each roof having a hydrophobic outside surface relative to the inside surfaces of each nozzle chamber by virtue of said polymeric coating.

Optionally, said nozzle chamber comprises sidewalls extending between said roof and a substrate, such that said roof is spaced apart from said substrate.

Optionally, said moving portion is configured to move towards said substrate upon actuation of said actuator.

In a further aspect the presenting invention provides an inkjet printhead comprising a plurality of nozzle assemblies, each nozzle assembly comprising:

- a nozzle chamber comprising a roof having a nozzle opening defined therein, said roof comprising a moving portion moveable relative to a stationary portion such that movement of said moving portion relative to said stationary portion causes ejection of ink through the nozzle opening;
- an actuator for moving said moving portion relative to said stationary portion; and
- a seal member interconnecting said moving portion and said stationary portion, wherein said seal member has a non-planar profile configured for facilitating movement of said moving portion.

Optionally, a nozzle plate of said printhead comprises a polymeric coating.

Optionally, said polymeric coating comprises said seal members.

In a second aspect the present invention provides an inkjet printhead comprising:

- a stationary portion;
- a plurality of moving portions for ejection of ink; and
- a plurality of seal members, each seal member connecting a respective moving portion with said stationary portion, wherein each seal member is configured as a bridge spanning between its respective moving portion and said stationary portion.

Optionally, a nozzle plate comprises the plurality of moving portions and the stationary portion.

Optionally, said nozzle plate comprises a flexible polymeric coating, said coating comprising said seal members.

Optionally, said polymeric coating is hydrophobic.

Optionally, the polymeric coating is comprised of polydimethylsiloxane (PDMS).

Optionally, said seal member is absent from a space between said moving portion and said stationary portion.

Optionally, said seal member has a non-planar profile configured for facilitating movement of said moving portion.

Optionally, each seal member comprises at least one ridge and/or at least one furrow in profile.

Optionally, each seal member comprises a crown portion, said crown portion standing proud of a first end of said seal member connected to said moving portion and a second end of said seal member connected to said stationary portion.

Optionally, each seal member is corrugated.

In another aspect the present invention provides a printhead comprising a plurality of nozzle assemblies, each nozzle assembly comprising:

a nozzle chamber comprising a roof having a nozzle opening defined therein, said roof comprising one of said moving portions moveable relative to said stationary portion, such that movement of said moving portion relative to said stationary portion causes ejection of ink through the nozzle opening;

an actuator for moving said moving portion relative to said stationary portion; and one of said seal members bridging between said moving portion and said stationary portion.

Optionally, said nozzle opening is defined in said moving portion.

Optionally, said nozzle opening is defined in said stationary portion.

Optionally, said actuator is a thermal bend actuator comprising:

a first active element for connection to drive circuitry; and a second passive element mechanically cooperating with the first element, such that when a current is passed through the first element, the first element expands relative to the second element, resulting in bending of the actuator.

Optionally, said first and second elements are cantilever beams.

Optionally, said thermal bend actuator defines at least part of the moving portion of said roof Optionally, said nozzle chamber comprises sidewalls extending between said roof and a substrate, such that said roof is spaced apart from said substrate.

Optionally, said moving portion is configured to move towards said substrate upon actuation of said actuator.

Optionally, said roof and said sidewalls are comprised of a ceramic material depositable by CVD, said ceramic material being selected from the group comprising: silicon nitride, silicon oxide and silicon oxynitride.

In a further aspect the present invention provides an inkjet printer comprising the printhead according to claim 1.

In a third aspect the present invention provides a method of fabricating an inkjet nozzle assembly having a seal member bridging between a moving portion and a stationary portion, said method comprising the steps of:

(a) providing a partially-fabricated printhead comprising a nozzle chamber sealed with a roof, (b) etching a via through said roof to define said moving portion on a first side of said via and said stationary portion on a second side of said via;

(c) plugging said via with a plug of sacrificial material;

(d) depositing a layer of flexible material over at least said plug; and (e) removing said plug to provide said inkjet nozzle assembly having said seal member bridging between said moving portion and said stationary portion, wherein said seal member is comprised of said flexible material.

Optionally, said flexible material a polymeric material.

Optionally, said flexible material is comprised of polydimethylsiloxane (PDMS).

Optionally, said plug fills said via, such that said seal member is absent from said via.

Optionally, said plug has a head extending out of said via, said head presenting a scaffold surface for deposition of said flexible material.

Optionally, said seal member has a non-planar profile configured for facilitating movement of said moving portion.

Optionally, said seal member comprises at least one ridge and/or at least one furrow in profile.

Optionally, said seal member comprises a crown portion, said crown portion standing proud of a first end of said seal member connected to said moving portion and a second end of said seal member connected to said stationary portion.

Optionally, said seal member is corrugated.

In a further aspect the present invention provides a method further comprising the step of:

etching a nozzle opening through said roof prior to removal of said sacrificial material.

Optionally, said nozzle opening is etched through said moving portion.

Optionally, said moving portion comprises a thermal bend actuator.

Optionally, said thermal bend actuator comprises:

a first active element for connection to drive circuitry; and a second passive element mechanically cooperating with the first element, such that when a current is passed through the first element, the first element expands relative to the second element, resulting in bending of the actuator.

Optionally, said flexible material is a hydrophobic material, and wherein said deposition of said flexible material is over a substantial portion of said roof such that said roof is relatively hydrophobic.

Optionally, said nozzle chamber comprises sidewalls extending between said roof and a substrate, such that said roof is spaced apart from said substrate.

Optionally, said moving portion is configured to move towards said substrate upon actuation of an actuator.

Optionally, said flexible layer is covered with a sacrificial protective metal layer prior to removal of said plug.

Optionally, said sacrificial protective metal layer is removed after removal of said plug.

Optionally, said plug is removed by exposing said nozzle assembly to an oxidizing plasma.

In a further aspect the present invention provides an inkjet nozzle assembly having a seal member bridging between a moving portion and a stationary portion, wherein said seal member is comprised of a flexible material deposited over a roof of said nozzle assembly.

BRIEF DESCRIPTION OF THE DRAWINGS

Optional embodiments of the present invention will now be described by way of example only with reference to the accompanying drawings, in which.

DETAILED DESCRIPTION OF SPECIFIC EMBODIMENTS

Nozzle Assembly with Polymer Filling Space Between Moving Portion and Stationary Portion FIGS. 1 to 16 shows a sequence of MEMS fabrication steps for an inkjet nozzle assembly 100 described in our earlier U.S. application Ser. No. 11/763,440, the contents of which is herein incorporated by reference. The completed inkjet nozzle assembly 100 shown in FIGS. 15 and 16 utilizes thermal bend actuation, whereby a moving portion of a roof bends towards a substrate resulting in ink ejection.

The starting point for MEMS fabrication is a standard CMOS wafer having CMOS drive circuitry formed in an upper portion of a silicon wafer. At the end of the MEMS fabrication process, this wafer is diced into individual printhead integrated circuits (ICs), with each IC comprising drive circuitry and plurality of nozzle assemblies.

Figure 1:
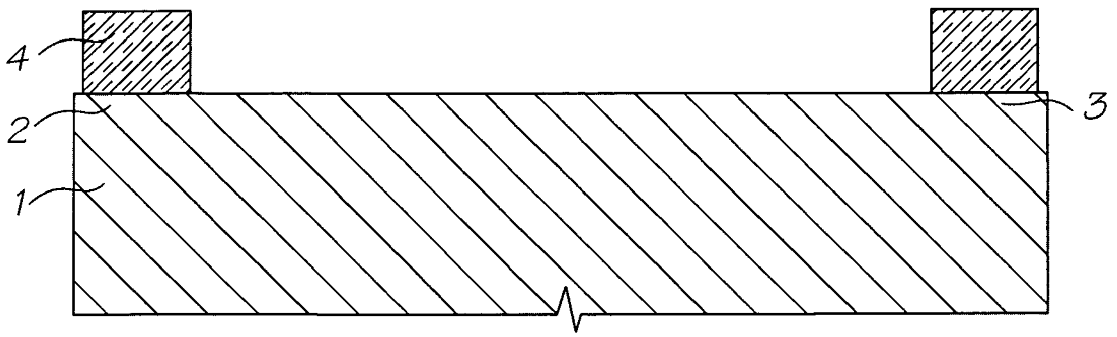
FIG. 1 is a side-sectional view of a partially-fabricated inkjet nozzle assembly after a first sequence of steps in which nozzle chamber sidewalls are formed.
Figure 2:
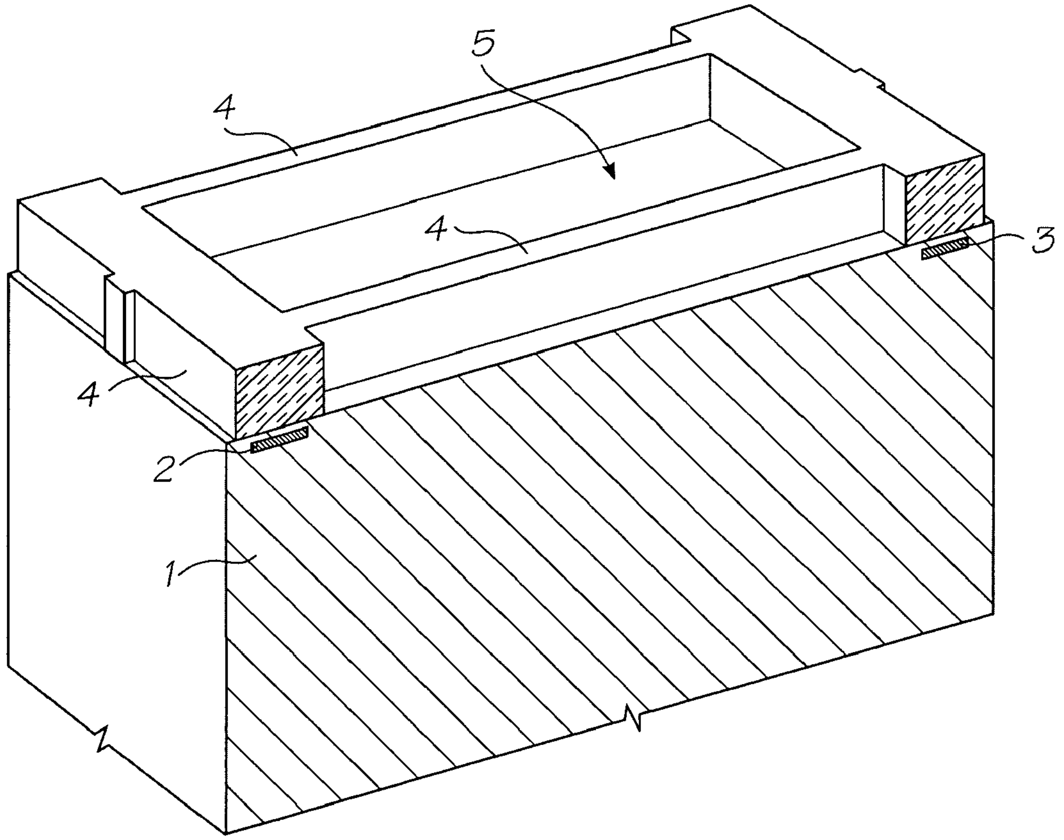
FIG. 2 is a perspective view of the partially-fabricated inkjet nozzle assembly shown in FIG. 4.

As shown in FIGS. 1 and 2, a substrate 1 has an electrode 2 formed in an upper portion thereof. The electrode 2 is one of a pair of adjacent electrodes (positive and earth) for supplying power to an actuator of the inkjet nozzle 100. The electrodes receive power from CMOS drive circuitry (not shown) in upper layers of the substrate 1.

The other electrode 3 shown in FIGS. 1 and 2 is for supplying power to an adjacent inkjet nozzle. In general, the drawings shows MEMS fabrication steps for a nozzle assembly, which is one of an array of nozzle assemblies. The following description focuses on fabrication steps for one of these nozzle assemblies. However, it will of course be appreciated that corresponding steps are being performed simultaneously for all nozzle assemblies that are being formed on the wafer. Where an adjacent nozzle assembly is partially shown in the drawings, this can be ignored for the present purposes. Accordingly, the electrode 3 and all features of the adjacent nozzle assembly will not be described in detail herein. Indeed, in the interests of clarity, some MEMS fabrication steps will not be shown on adjacent nozzle assemblies.

In the sequence of steps shown in FIGS. 1 and 2, an 8 micron layer of silicon dioxide is initially deposited onto the substrate 1. The depth of silicon dioxide defines the depth of a nozzle chamber 5 for the inkjet nozzle. After deposition of the $SiO_2$ layer, it is etched to define walls 4, which will become sidewalls of the nozzle chamber 5, shown most clearly in FIG. 2.

Figure 3:
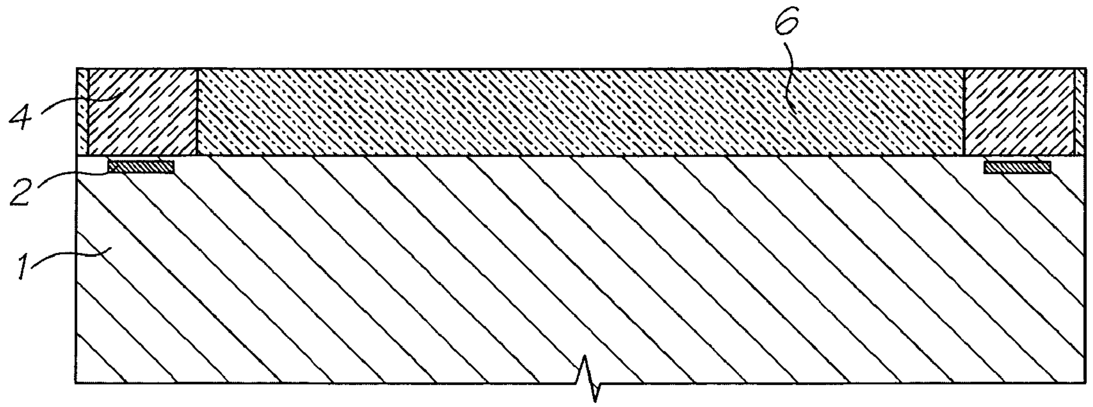
FIG. 3 is a side-sectional view of a partially-fabricated inkjet nozzle assembly after a second sequence of steps in which the nozzle chamber is filled with polyimide.
Figure 4:
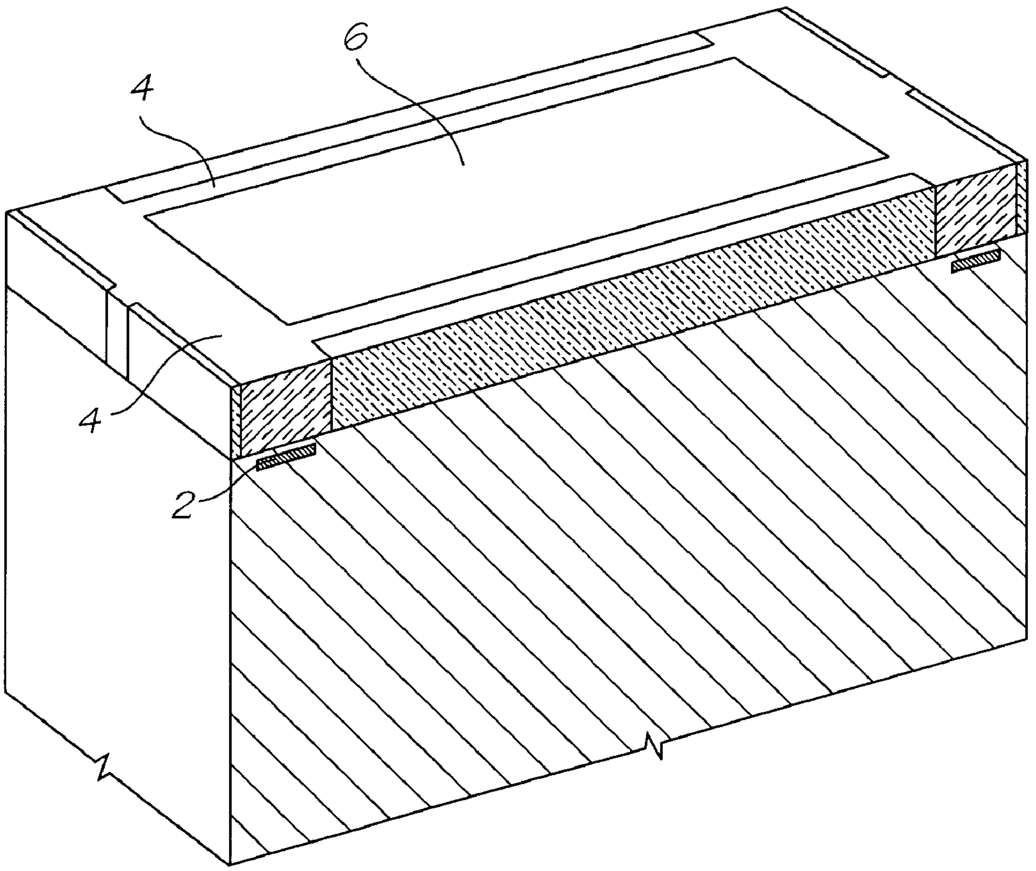
FIG. 4 is a perspective view of the partially-fabricated inkjet nozzle assembly shown in FIG. 3.

As shown in FIGS. 3 and 4, the nozzle chamber 5 is then filled with photoresist or polyimide 6, which acts as a sacrificial scaffold for subsequent deposition steps. The polyimide 6 is spun onto the wafer using standard techniques, UV cured and/or hardbaked, and then subjected to chemical mechanical planarization (CMP) stopping at the top surface of the $SiO_2$ wall 4.

Figure 5:
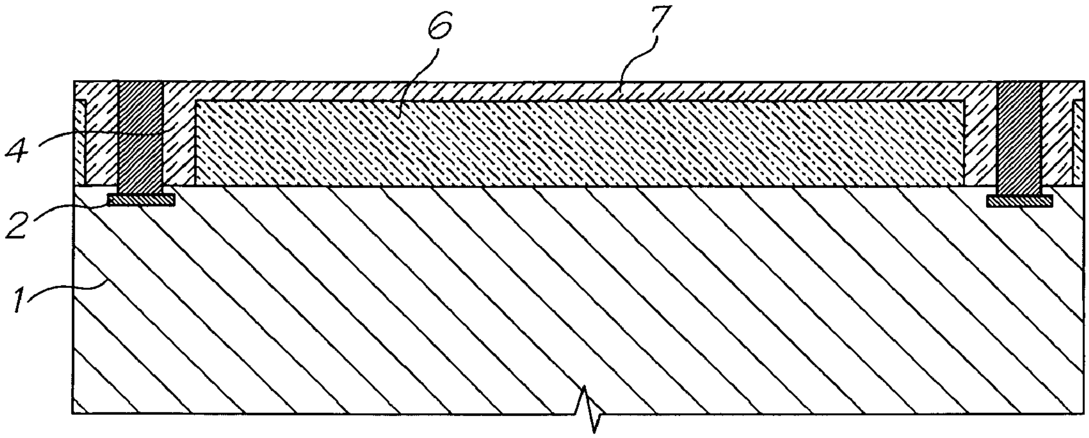
FIG. 5 is a side-sectional view of a partially-fabricated inkjet nozzle assembly after a third sequence of steps in which connector posts are formed up to a chamber roof.
Figure 6:
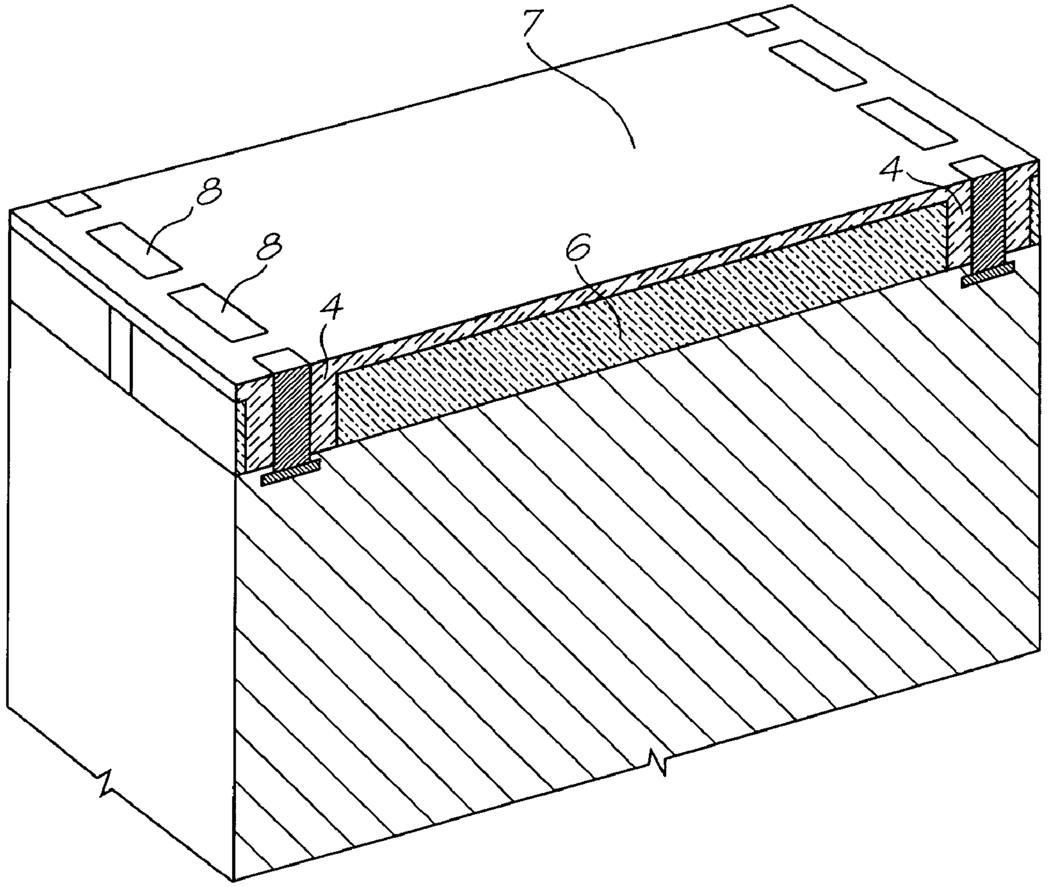
FIG. 6 is a perspective view of the partially-fabricated inkjet nozzle assembly shown in FIG. 5.

In FIGS. 5 and 6, a roof member 7 of the nozzle chamber 5 is formed as well as highly conductive connector posts 8 extending down to the electrodes 2. Initially, a 1.7 micron layer of $SiO_2$ is deposited onto the polyimide 6 and wall 4. This layer of $SiO_2$ defines a roof 7 of the nozzle chamber 5. Next, a pair of vias are formed in the wall 4 down to the electrodes 2 using a standard anisotropic DRIE. This etch exposes the pair of electrodes 2 through respective vias. Next, the vias are filled with a highly conductive metal, such as copper, using electroless plating. The deposited copper posts 8 are subjected to CMP, stopping on the $SiO_2$ roof member 7 to provide a planar structure. It can be seen that the copper connector posts 8, formed during the electroless copper plating, meet with respective electrodes 2 to provide a linear conductive path up to the roof member 7.

Figure 7:
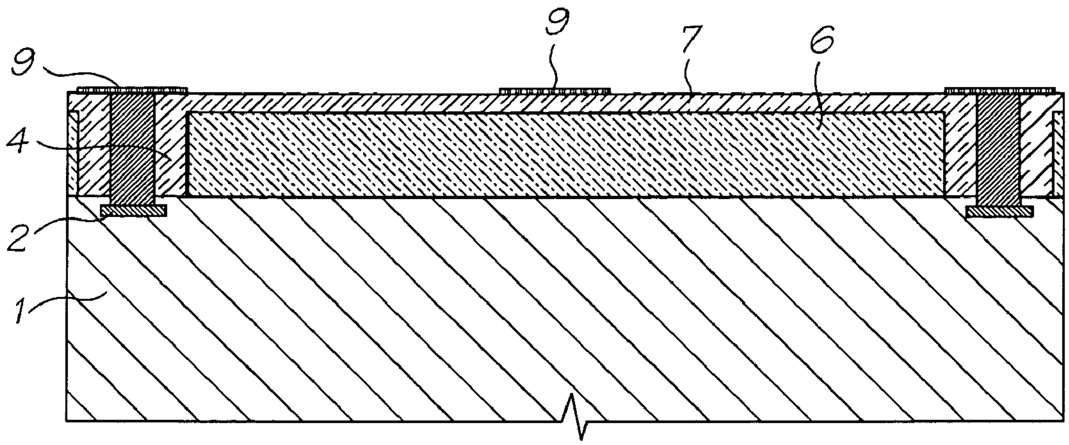
FIG. 7 is a side-sectional view of a partially-fabricated inkjet nozzle assembly after a fourth sequence of steps in which conductive metal plates are formed.
Figure 8:
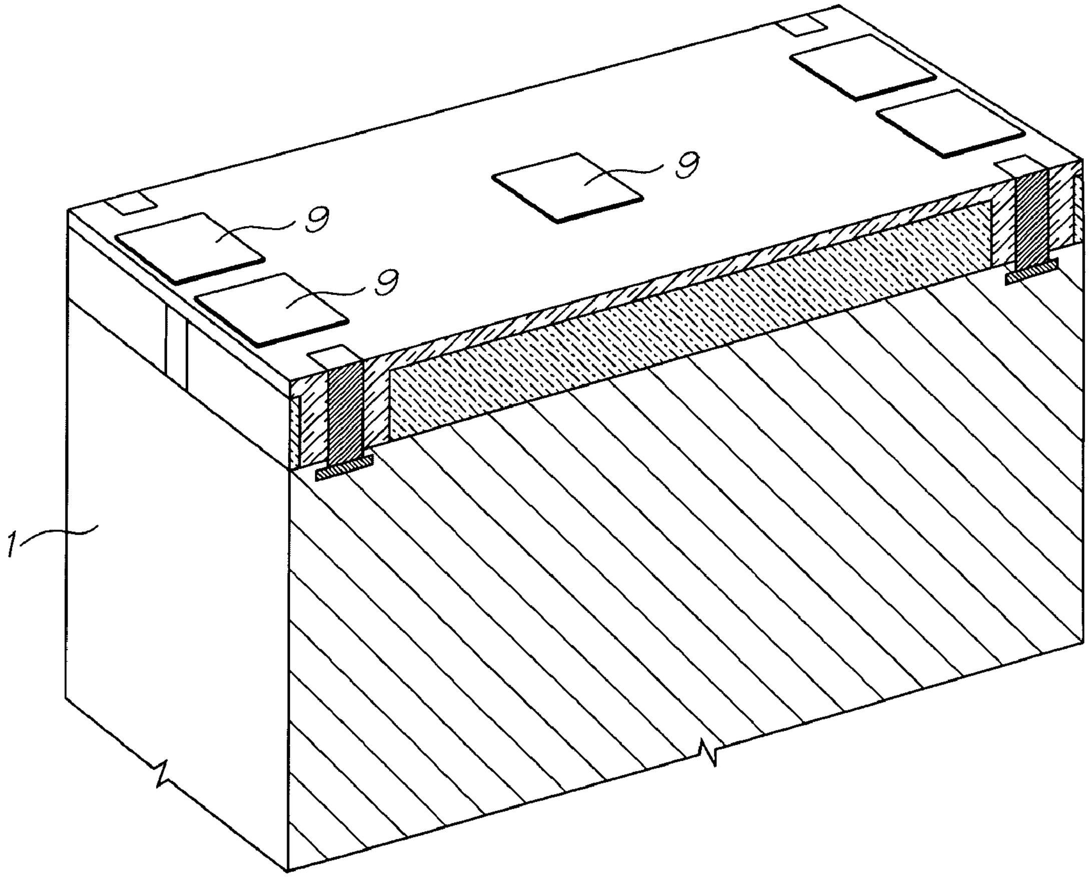
FIG. 8 is a perspective view of the partially-fabricated inkjet nozzle assembly shown in FIG. 7.

In FIGS. 7 and 8, metal pads 9 are formed by initially depositing a 0.3 micron layer of aluminium onto the roof member 7 and connector posts 8. Any highly conductive metal (e.g. aluminium, titanium etc.) may be used and should be deposited with a thickness of about 0.5 microns or less so as not to impact too severely on the overall planarity of the nozzle assembly. The metal pads 9 are positioned over the connector posts 8 and on the roof member 7 in predetermined 'bend regions' of the thermoelastic active beam member.

Figure 9:
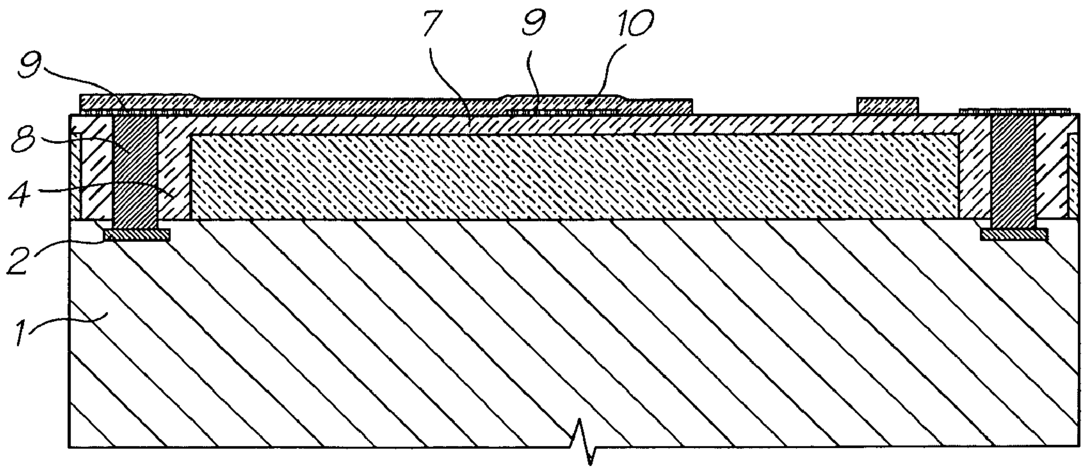
FIG. 9 is a side-sectional view of a partially-fabricated inkjet nozzle assembly after a fifth sequence of steps in which an active beam member of a thermal bend actuator is formed.
Figure 10:
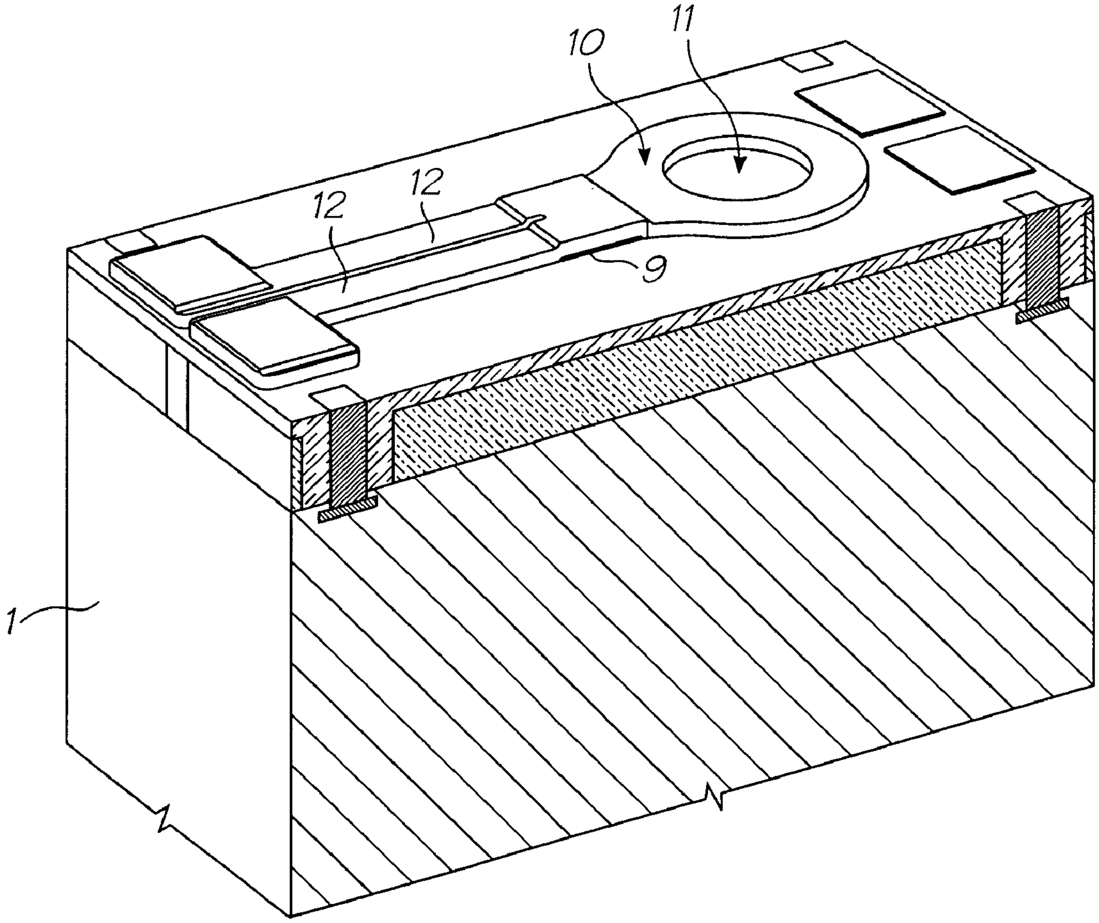
FIG. 10 is a perspective view of the partially-fabricated inkjet nozzle assembly shown in FIG. 9.

In FIGS. 9 and 10, a thermoelastic active beam member 10 is formed over the $SiO_2$ roof 7. By virtue of being fused to the active beam member 10, part of the $SiO_2$ roof member 7 functions as a lower passive beam member 16 of a mechanical thermal bend actuator, which is defined by the active beam 10 and the passive beam 16. The thermoelastic active beam member 10 may be comprised of any suitable thermoelastic material, such as titanium nitride, titanium aluminium nitride and aluminium alloys. As explained in the Applicant's earlier U.S. application Ser. No. 11/607,976 filed on 4 Dec. 2002, the contents of which are herein incorporated by reference, vanadium-aluminium alloys are a preferred material, because they combine the advantageous properties of high thermal expansion, low density and high Young's modulus.

To form the active beam member 10, a 1.5 micron layer of active beam material is initially deposited by standard PECVD. The beam material is then etched using a standard metal etch to define the active beam member 10. After completion of the metal etch and as shown in FIGS. 9 and 10, the active beam member 10 comprises a partial nozzle opening 11 and a beam element 12, which is electrically connected at each end to positive and ground electrodes 2 via the connector posts 8. The planar beam element 12 extends from a top of a first (positive) connector post and bends around 180 degrees to return to a top of a second (ground) connector post.

Still referring to FIGS. 9 and 10, the metal pads 9 are positioned to facilitate current flow in regions of potentially higher resistance. One metal pad 9 is positioned at a bend region of the beam element 12, and is sandwiched between the active beam member 10 and the passive beam member 16. The other metal pads 9 are positioned between the top of the connector posts 8 and the ends of the beam element 12.

Figure 11:
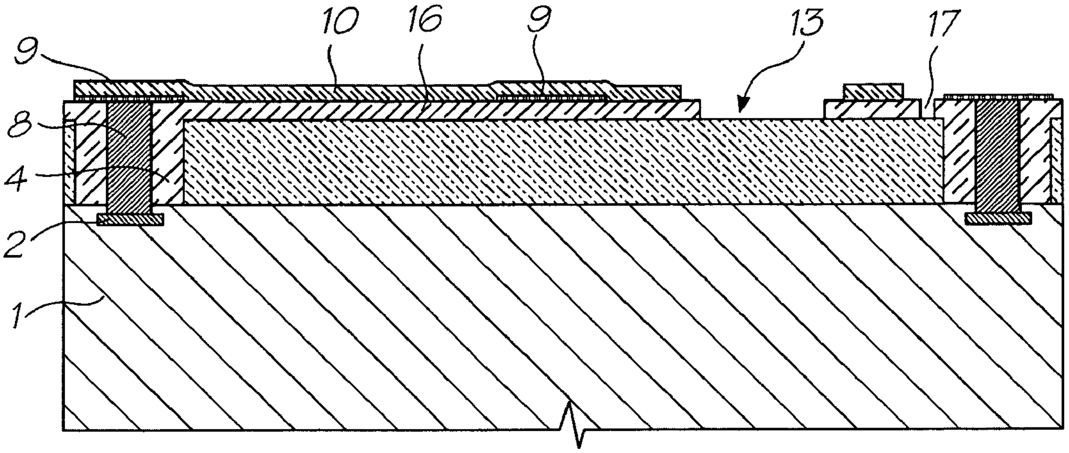
FIG. 11 is a side-sectional view of a partially-fabricated inkjet nozzle assembly after a sixth sequence of steps in which a moving roof portion comprising the thermal bend actuator is formed.
Figure 12:
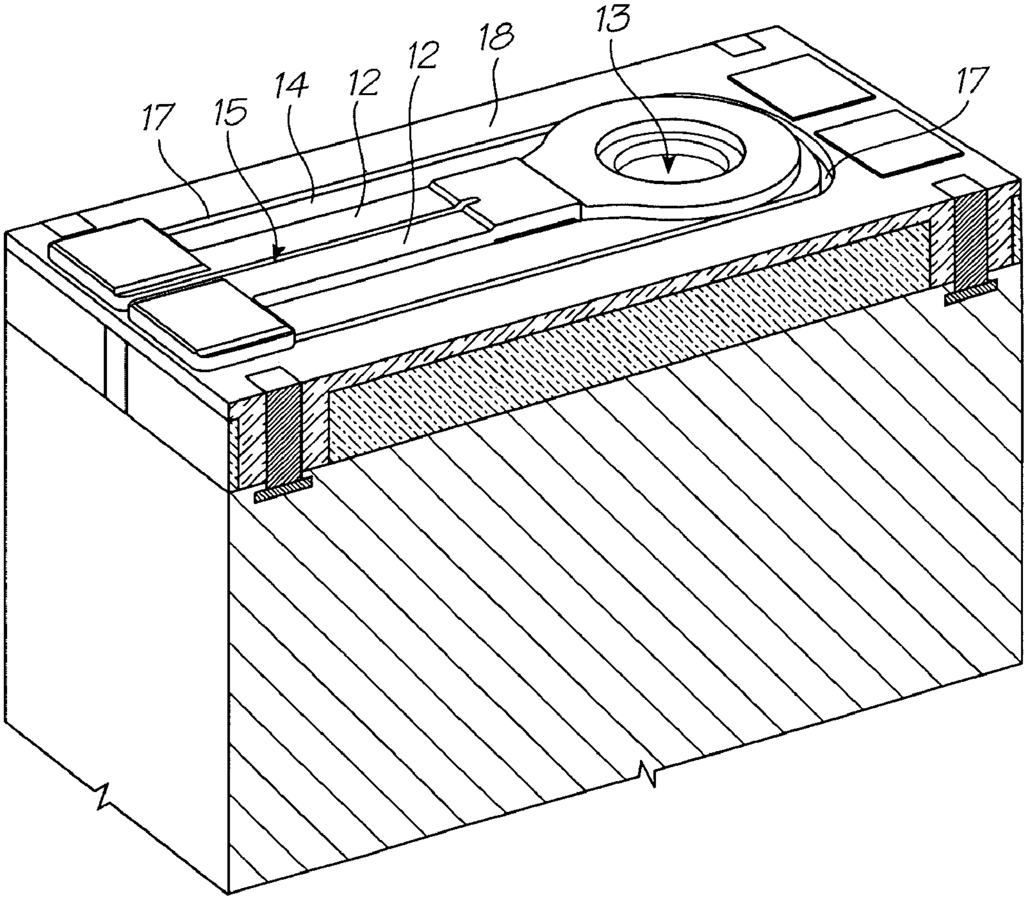
FIG. 12 is a perspective view of the partially-fabricated inkjet nozzle assembly shown in FIG. 11.

Referring to FIGS. 11 and 12, the $SiO_2$ roof member 7 is then etched to define fully a nozzle opening 13 and a moving portion 14 of the roof The moving portion 14 comprises a thermal bend actuator 15, which is itself comprised of the active beam member 10 and the underlying passive beam member 16. The nozzle opening 13 is defined in the moving portion 14 of the roof so that the nozzle opening moves with the actuator during actuation. Configurations whereby the nozzle opening 13 is stationary with respect to the moving portion 14, as described in Applicant's U.S. application Ser. No. 11/607,976 incorporated herein by reference, are also possible.

A perimeter space or gap 17 around the moving portion 14 of the roof separates the moving portion from a stationary portion 18 of the roof. This gap 17 allows the moving portion 14 to bend into the nozzle chamber 5 and towards the substrate 1 upon actuation of the actuator 15.

Figure 13:
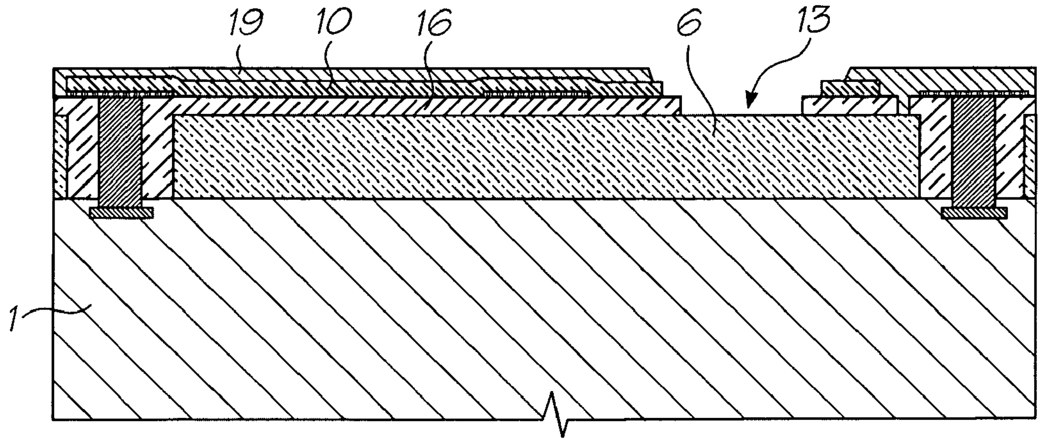
FIG. 13 is a side-sectional view of a partially-fabricated inkjet nozzle assembly after a seventh sequence of steps in which hydrophobic polymer layer is deposited and photopatterned.
Figure 14:
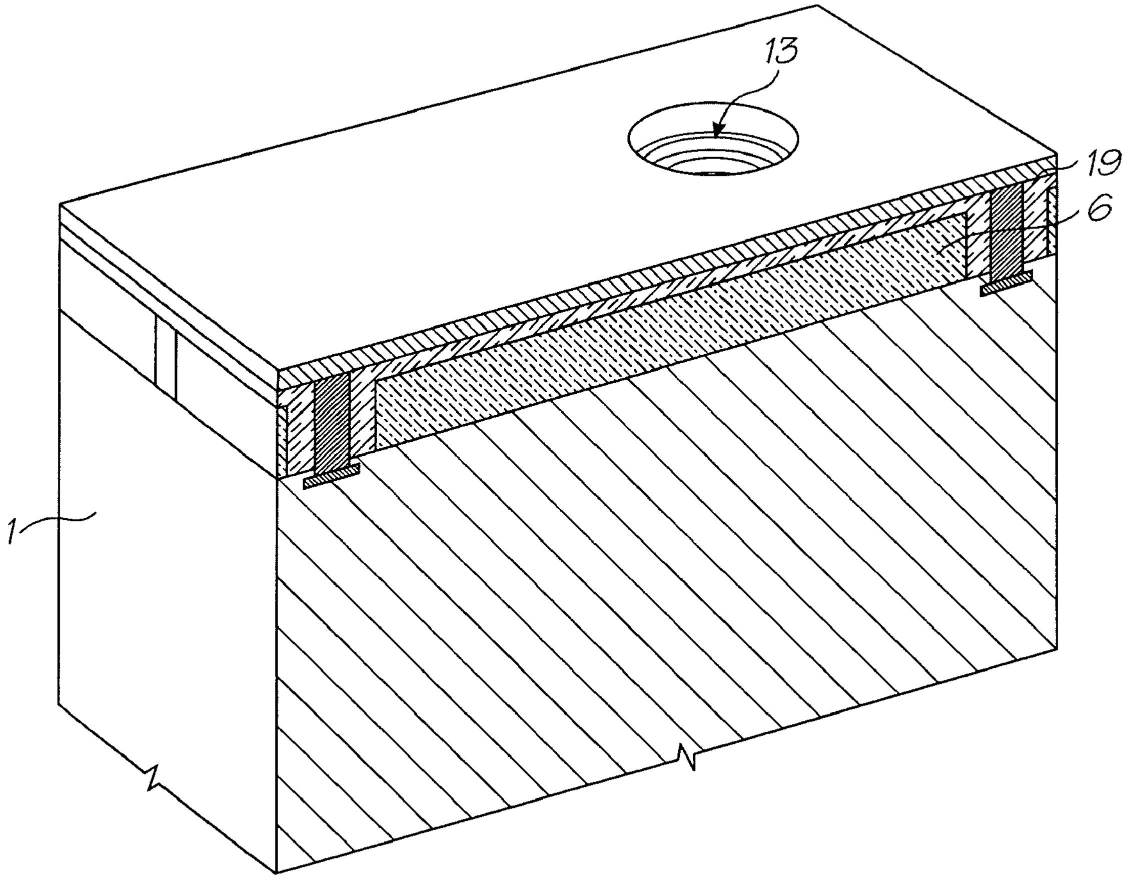
FIG. 14 is a perspective view of the partially-fabricated inkjet nozzle assembly shown in FIG. 13.

Referring to FIGS. 13 and 14, a layer of photopatternable hydrophobic polymer 19 is then deposited over the entire nozzle assembly, and photopatterned to re-define the nozzle opening 13.

The use of photopatternable polymers to coat arrays of nozzle assemblies was described extensively in our earlier U.S. application Ser. No. 11/685,084 filed on 12 Mar. 2007 and U.S. Ser. No. 11/740,925 filed on 27 Apr. 2007, the contents of which are incorporated herein by reference. Typically, the hydrophobic polymer is polydimethylsiloxane (PDMS) or perfluorinated polyethylene (PFPE). Such polymers are particularly advantageous because they are photopatternable, have high hydrophobicity, and low Young's modulus.

As explained in the above-mentioned US Applications, the exact ordering of MEMS fabrication steps, incorporating the hydrophobic polymer, is relatively flexible. For example, it is perfectly feasible to etch the nozzle opening 13 after deposition of the hydrophobic polymer 19, and use the polymer as a mask for the nozzle etch. It will appreciated that variations on the exact ordering of MEMS fabrication steps are well within the ambit of the skilled person, and, moreover, are included within the scope of the present invention.

The hydrophobic polymer layer 19 performs several functions. Firstly, it fills the gap 17 to provide a mechanical seal between the moving portion 14 and stationary portion 18 of the roof 7. Provided that the polymer has a sufficiently low Young's modulus, the actuator can still bend towards the substrate 1, whilst preventing ink from escaping through the gap 17 during actuation. Secondly, the polymer has a high hydrophobicity, which minimizes the propensity for ink to flood out of the relatively hydrophilic nozzle chambers and onto an ink ejection face 21 of the printhead. Thirdly, the polymer functions as a protective layer, which facilitates printhead maintenance.

Figure 15:
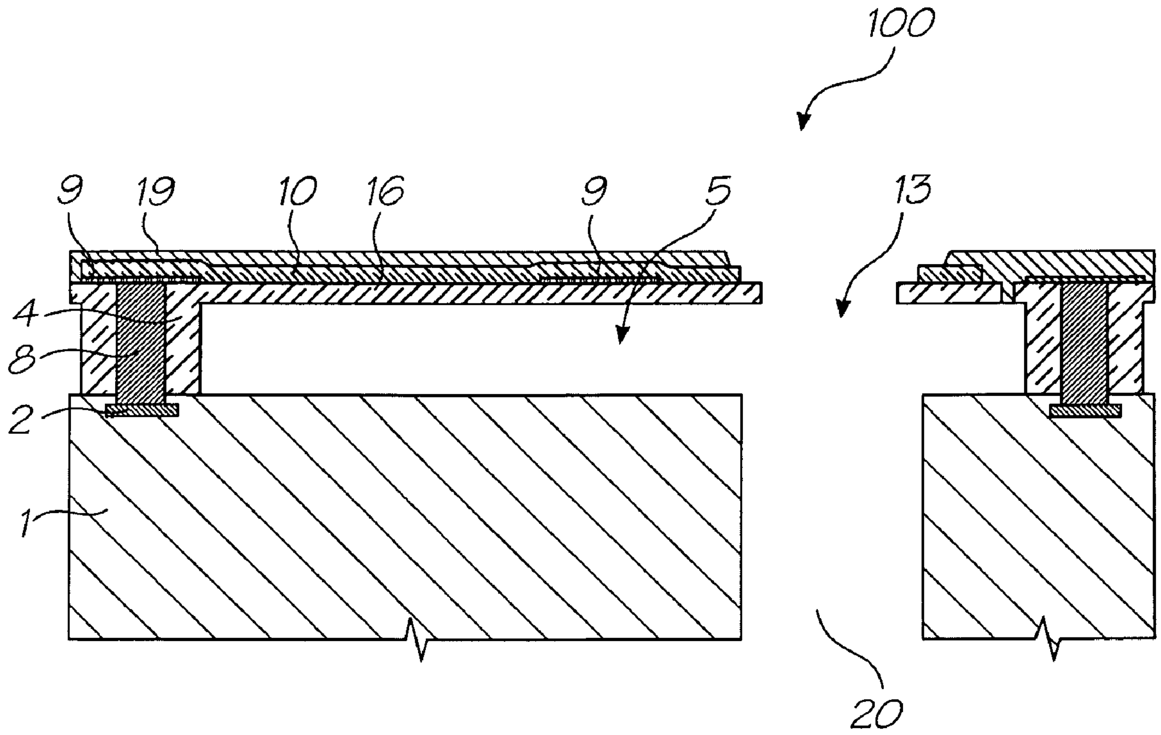
FIG. 15 is a side-sectional view of an fully formed inkjet nozzle assembly.
Figure 16:
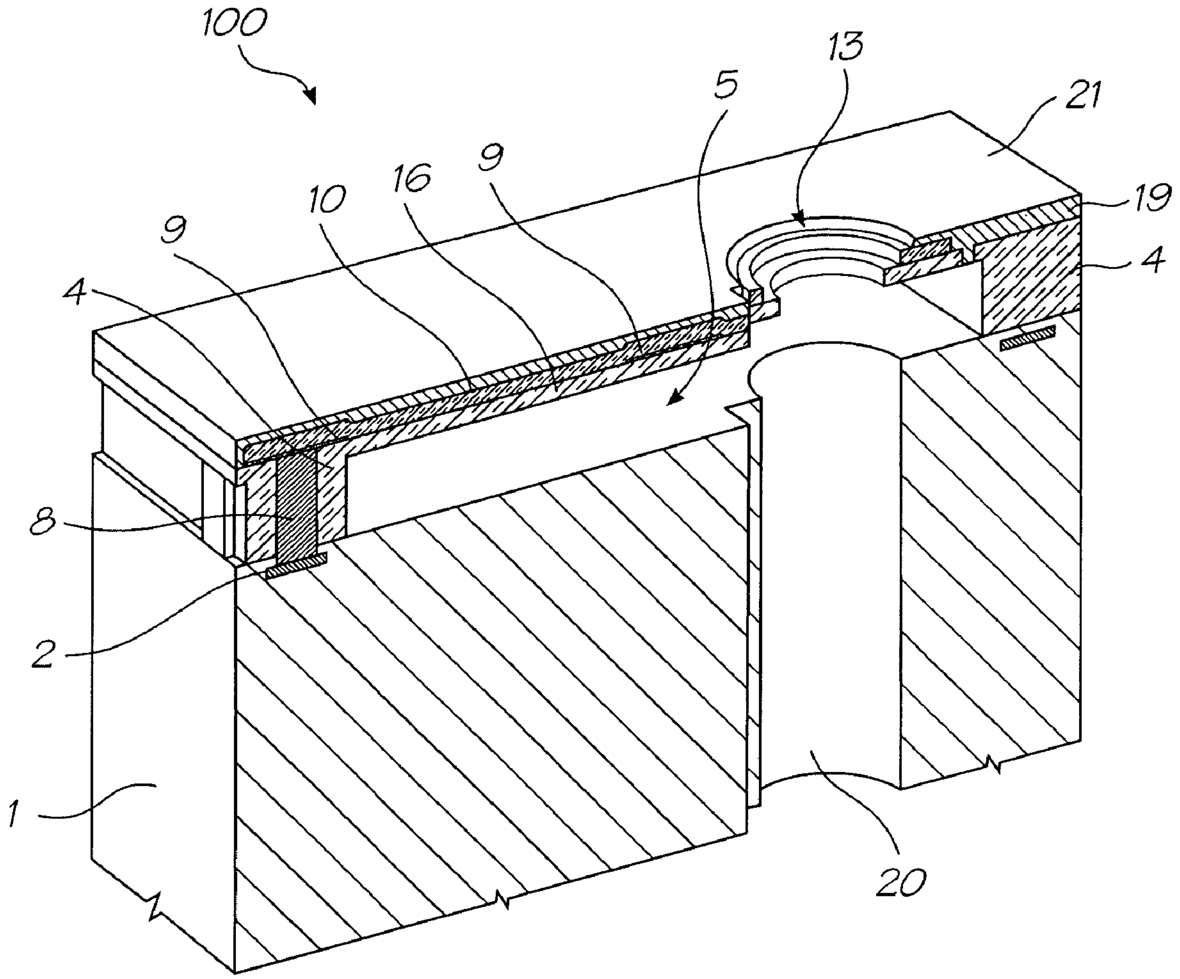
FIG. 16 is a cutaway perspective view of the inkjet nozzle assembly shown in FIG. 15.

Finally, and as shown in FIGS. 15 and 16, an ink supply channel 20 is etched through to the nozzle chamber 5 from a backside of the substrate 1. Although the ink supply channel 20 is shown aligned with the nozzle opening 13 in FIGS. 15 and 16, it could, of course, be positioned offset from the nozzle opening.

Following the ink supply channel etch, the polyimide 6, which filled the nozzle chamber 5, is removed by ashing (either frontside ashing or backside ashing) using, for example, an $O_2$ plasma to provide the nozzle assembly 100.

Although not described above, a metal film (e.g. titanium or aluminium) may be used to protect the polymer layer 19 during final stage MEMS processing, as described in our earlier U.S. application Ser. Nos. 11/740,925 and 11/946,840, the contents of which are herein incorporated by reference. Typically, the protective metal film is deposited onto the polymer layer 19 prior to etching the nozzle opening 13. After all etching and oxidative photoresist removal steps ("ashing steps") have been completed, the protective metal film may be removed using a simple HF or $H_2O_2$ rinse.

Nozzle Assembly with Polymer Bridging Space Between Moving Portion and Stationary Portion In the nozzle assembly 100 described above, the polymer layer 19 fills the gap between the moving portion 14 and the stationary portion 18 of the roof 7. Although this provides a good mechanical seal and can be readily manufactured, the configuration of the seal inevitably impacts on the overall performance and efficiency of the nozzle assembly.

Turning to FIGS. 17 to 22, there is shown schematically an alternative sequence of fabrication steps, which results in an improved sealing member bridging between the moving portion 14 and stationary portion 18. In the interests of simplicity, the schematic illustrations in FIGS. 17 to 22 do not show detailed features of the actuator. However, it will be appreciated that FIG. 17, which is the starting point for this alternative sequence of fabrication steps, is schematically representative of the partially-formed nozzle assembly shown in FIGS. 9 and 10. In the interests of clarity, like reference numerals will be used to refer to corresponding features in the nozzle assembly.

Figure 17:
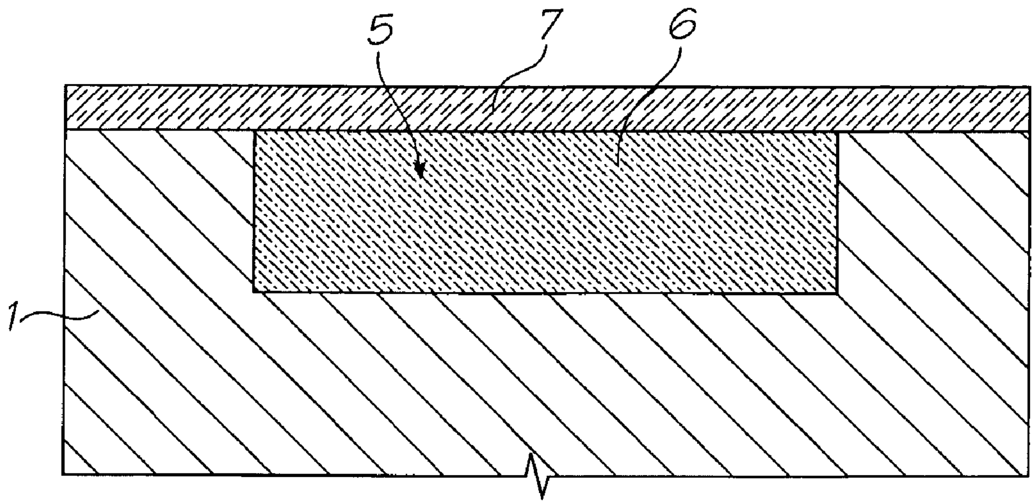
FIG. 17 is a schematic side-sectional view of the partially-fabricated inkjet nozzle assembly shown in FIGS. 9 and 10.

Referring then to FIG. 17, there is shown a partially-formed nozzle assembly having a nozzle chamber 5 filled with polyimide 6. A roof 7 comprising a thermal bend actuator (not shown in FIG. 17) forms a cover over the nozzle chamber 5.

Figure 18:
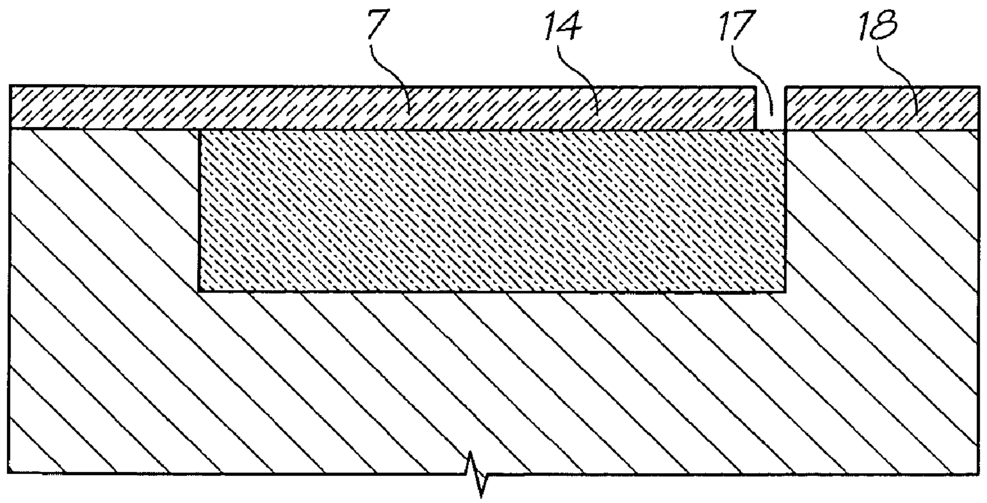
FIG. 18 is a schematic side-sectional view of the partially-fabricated inkjet nozzle shown in FIG. 17 after etching a via to define moving and stationary portions of a chamber roof.

In FIG. 18, a via is etched into the roof 7. The via defines the gap 17 between the moving portion 14 and the stationary portion 18 of the roof 7.

Figure 19:
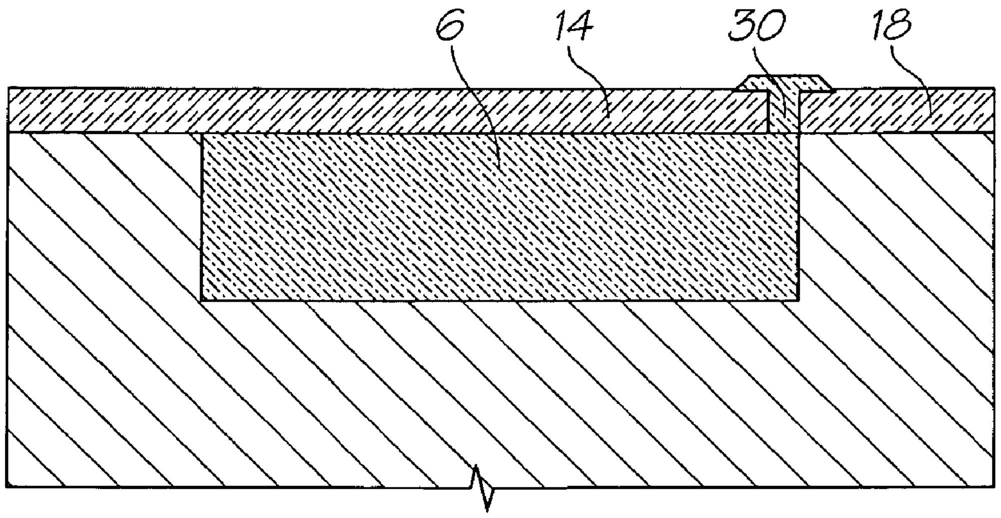
FIG. 19 is a schematic side-sectional view of the partially-fabricated inkjet nozzle shown in FIG. 18 after filling the via with a plug of photoresist.

Referring next to FIG. 19, the gap 17 is filled with a plug 30 of sacrificial material, such as photoresist. The plug 30 serves as a sacrificial scaffold for deposition of a polymeric seal member in a subsequent step. Specifically, an upper surface of the plug 30 defines a profile of the seal member. The configuration of the plug 30 and the profile of its upper surface may be controlled by conventional photolithographic techniques. For example, sloped sidewalls of the plug 30 may be formed by adjusting a focusing parameter during exposure of the photoresist.

Figure 20:
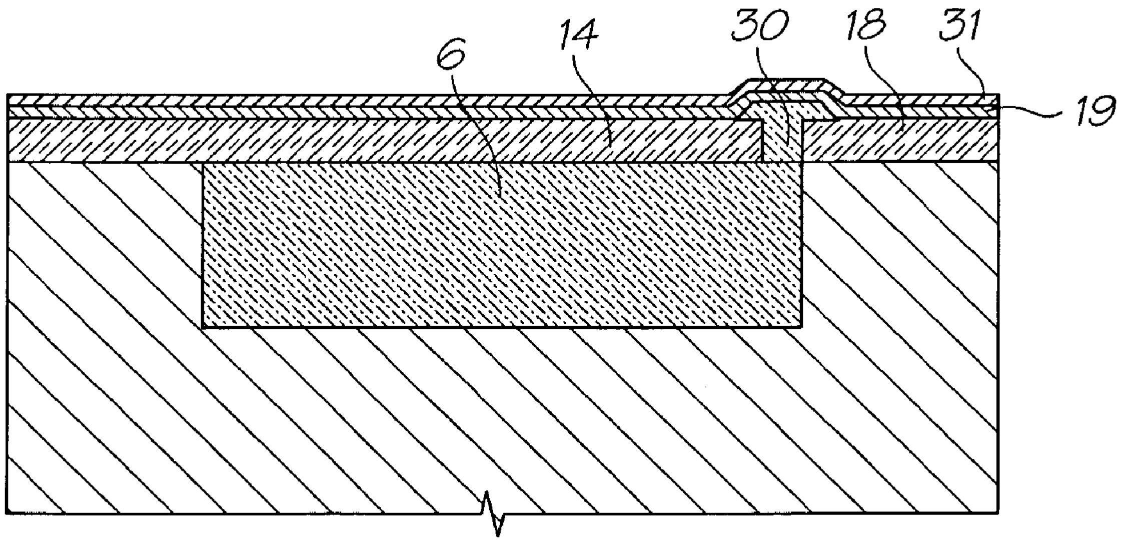
FIG. 20 is a schematic side-sectional view of the partially-fabricated inkjet nozzle shown in FIG. 19 after deposition of a polymer layer and a protective metal layer.

Following formation of the plug 30, the partially-formed nozzle assembly is then coated with a layer 19 of flexible polymeric material. Typically, the polymeric material is polydimethylsiloxane (PDMS). As shown in FIG. 20, the PDMS layer 19 conforms to the profile of an upper surface of the nozzle assembly.

A protective aluminium film 31 is subsequently deposited over the PDMS layer 19. The aluminium film 31 protects the PDMS layer 19 from an oxidative plasma used for removal of the polyimide 6 (FIG. 22).

Figure 21:
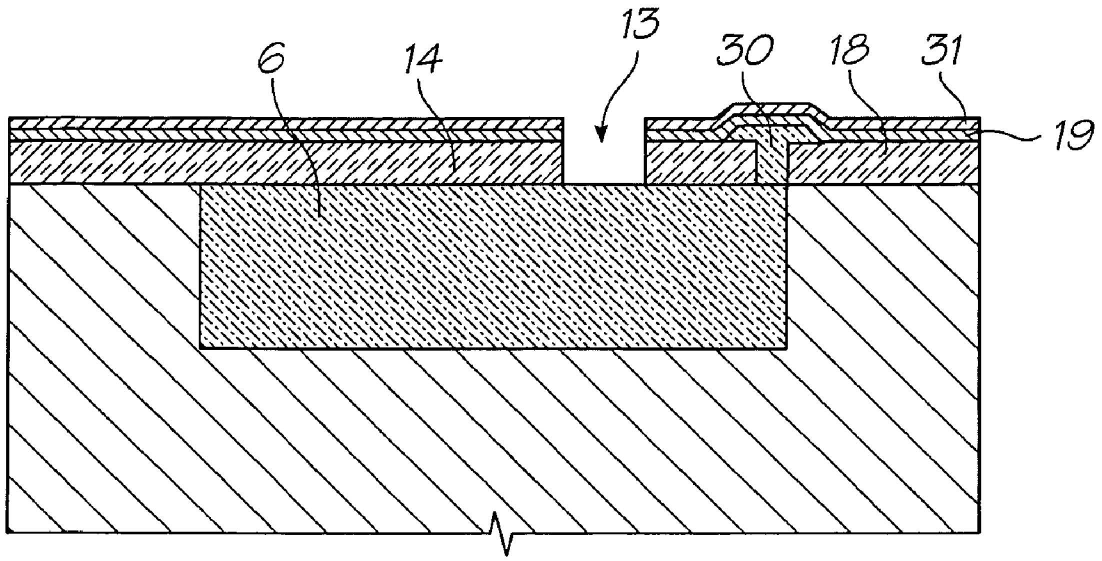
FIG. 21 is a schematic side-sectional view of the partially-fabricated inkjet nozzle shown in FIG. 20 after etching a nozzle opening.

Referring now to FIG. 21, the nozzle opening 13 is then defined by etching through the aluminium film 31, the PDMS layer 19 and the roof 7. This etch may require different etch chemistries at different stages in order to etch through all three layers.

Figure 22:
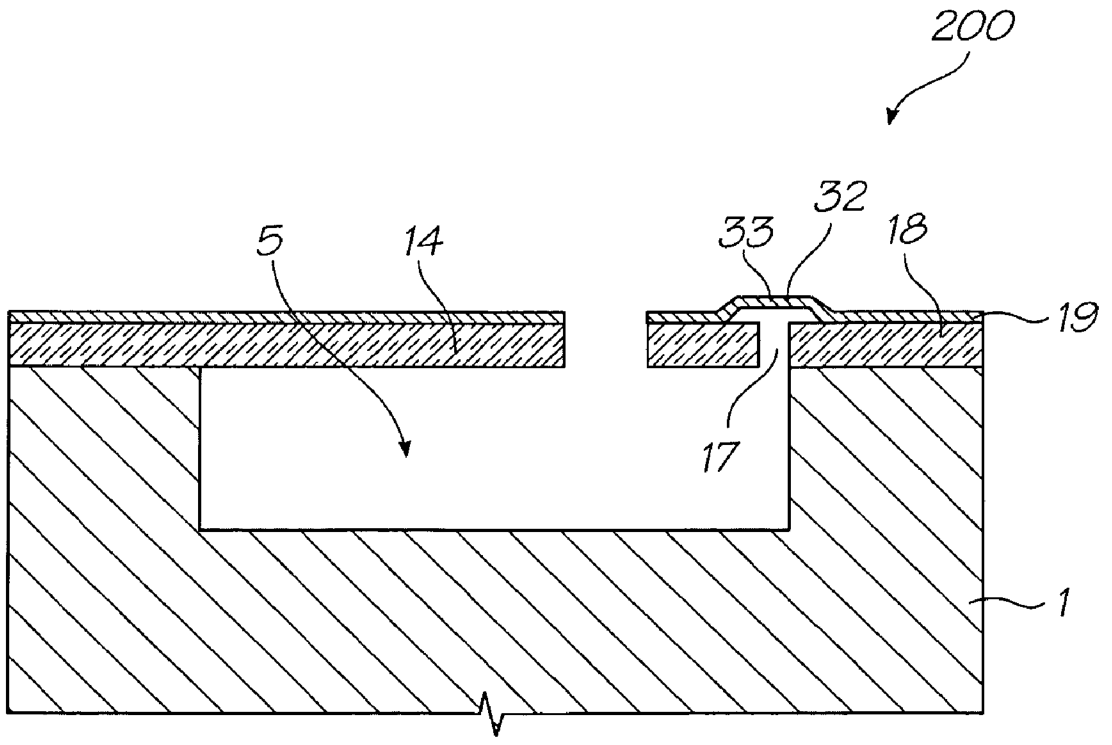
FIG. 22 is a schematic side-sectional view of an inkjet nozzle assembly according to the present invention.

Finally, and referring to FIG. 22, the nozzle assembly is subjected to an oxidative plasma (e.g. $O_2$ plasma), which removes the polyimide 6 and photoresist plug 30. Following oxidative removal of the polyimide 6 and plug 30, the protective aluminium layer 31 is removed by washing in HF or $H_2O_2$.

The completed nozzle assembly 200 shown in FIG. 22 has a seal member 32 bridging across the gap 17 between the moving portion 14 and the stationary portion 18 of the roof 7. Significantly, the seal member 32 does not fill the gap 17 and is, indeed, wholly absent from the space between the moving portion 14 and the stationary portion 18.

The seal member 32 has the profile of a bridge, where one end is connected to the moving portion 14 and the other end is connected to the stationary portion 18. Furthermore, the bridge substantially takes the form of a single-arch bridge, having a ridge or crown portion 33 standing proud of each end of the bridge. Of course, the seal member may alternatively take the form of a simple beam bridge spanning between the moving portion 14 and stationary portion 18, depending on the profile of the upper surface of the plug 30.

The seal member 32 has a number of advantages over the embodiment shown in FIGS. 15 and 16, where the gap 17 is completely filled with the polymeric material 19. Firstly, by reducing the overall volume of polymer between the moving portion 14 and the stationary portion 18, there is much less impedance to downward motion of the moving portion 14 towards the substrate 1. In addition, the profile of the seal member is specifically adapted to facilitate downward motion of the moving portion 14. Since the seal member 32 takes the form of a flexible bridge, having a length which is longer than the distance between the moving portion 14 and the stationary portion 18, any downward motion of the moving portion 14 during actuation can be readily accommodated by the bridge structure with minimal flexing or extension of the polymer material. Hence, the seal member 32 provides minimal impedance to movement of the moving portion 14, whilst still providing an excellent seal. By minimizing impedance to movement of the moving portion 14, the overall efficiency of the nozzle assembly 200, and printheads comprising such nozzle assemblies, is improved.

Figure 23:
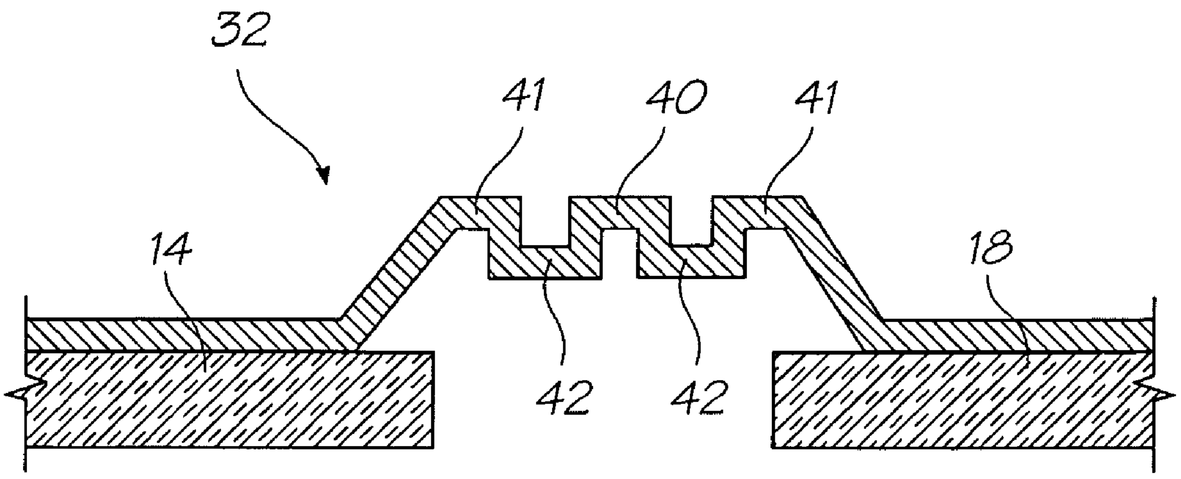
FIG. 23 is a schematic side-sectional view of an alternative seal member.

Of course, other configurations of the seal member 32 are within the ambit of the present invention. For example, as shown in FIG. 23, the seal member 32 may be a corrugated structure 40 having a plurality of ridges 41 and furrows 42. It will be appreciated that the corrugated structure 40 can readily accommodate movement of the moving portion 14

It will be appreciated by ordinary workers in this field that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A method of fabricating an inkjet nozzle assembly having a seal member bridging between a moving portion and a stationary portion, said method comprising the steps of:

(a) providing a partially-fabricated printhead comprising a nozzle chamber sealed with a roof;

(b) etching a via through said roof to define said moving portion on a first side of said via and said stationary portion on a second side of said via;

(c) plugging said via with a plug of sacrificial material;

(d) depositing a layer of flexible material over at least said plug; and (e) removing said plug to provide said inkjet nozzle assembly having said seal member bridging between said moving portion and said stationary portion, wherein said seal member is comprised of said flexible material.

2. The method of claim 1, wherein said flexible material a polymeric material.

3. The method of claim 1, wherein said flexible material is comprised of polydimethylsiloxane (PDMS).

4. The method of claim 1, wherein said plug fills said via, such that said seal member is absent from said via.

5. The method of claim 1, wherein said plug has a head extending out of said via, said head presenting a scaffold surface for deposition of said flexible material.

6. The method of claim 1, wherein said seal member has a non-planar profile configured for facilitating movement of said moving portion.

7. The method of claim 6, wherein said seal member comprises a crown portion, said crown portion standing proud of a first end of said seal member connected to said moving portion and a second end of said seal member connected to said stationary portion.

8. The method of claim 1, wherein said seal member comprises at least one ridge and/or at least one furrow in profile.

9. The method of claim 1, wherein said seal member is corrugated.

10. The method of claim 1, further comprising the step of: etching a nozzle opening through said roof prior to removal of said sacrificial material.

11. The method of claim 10, wherein said nozzle opening is etched through said moving portion.

12. The method of claim 1, wherein said moving portion comprises a thermal bend actuator.

13. The method of claim 12, wherein said thermal bend actuator comprises:

a first active element for connection to drive circuitry; and a second passive element mechanically cooperating with the first element, such that when a current is passed through the first element, the first element expands relative to the second element, resulting in bending of the actuator.

14. The method of claim 1, wherein said flexible material is a hydrophobic material, and wherein said deposition of said flexible material is over a substantial portion of said roof such that said roof is relatively hydrophobic.

15. The method of claim 1, wherein said nozzle chamber comprises sidewalls extending between said roof and a substrate, such that said roof is spaced apart from said substrate.

16. The method of claim 15, wherein said moving portion is configured to move towards said substrate upon actuation of an actuator.

17. The method of claim 1, wherein said flexible layer is covered with a sacrificial protective metal layer prior to removal of said plug.

18. The method of claim 17, wherein said sacrificial protective metal layer is removed after removal of said plug.

19. The method of claim 1, wherein said plug is removed by exposing said nozzle assembly to an oxidizing plasma.

* * * * *